United States Patent [19]

Beckershoff

[11] 4,112,582

[45] Sep. 12, 1978

[54] APPARATUS FOR POSITIONING COAXIAL ARRANGED MACHINE PARTS

[75] Inventor: Wolfgang Beckershoff, Aarau, Switzerland

[73] Assignee: BBC Brown Boveri & Company Limited, Baden, Switzerland

[21] Appl. No.: 682,633

[22] Filed: May 3, 1976

[30] Foreign Application Priority Data

Jul. 4, 1975 [CH] Switzerland ........................ 8731/75

[51] Int. Cl.$^2$ .............................................. G01B 5/25

[52] U.S. Cl. ................................ 33/181 R; 33/180 R

[58] Field of Search .................... 33/181 R, 180 R, 84

[56] References Cited

U.S. PATENT DOCUMENTS

| | | | |
|---|---|---|---|
| 2,411,621 | 11/1946 | Grubbs | 33/181 R |
| 3,276,136 | 10/1966 | Testa | 33/181 R |

*Primary Examiner*—Richard E. Aegerter
*Assistant Examiner*—Willis Little
*Attorney, Agent, or Firm*—Burns, Doane, Swecker & Mathis

[57] ABSTRACT

An arrangement for positioning an inner circular machine part within an outer circular machine part, the parts being for example a guide vane carrier for a turbomachine which is positioned within an outer housing, and wherein it is desired to adjust the inner machine part within a plane perpendicular to the longitudinal axis of the machine comprises cranked positioning keys which interconnect circumferentially spaced radial recesses in the periphery of the inner machine part with similarly circumferentially spaced non-radial recesses in the outer machine part. The keys are adjustably mounted in the non-radial recesses of the outer machine part, and the center line of the portion of each key engaging the radial recess forms an angle with the center line of the portion of each key engaging the non-radial recess. Longitudinal adjustment of the cranked key in the non-radial recess is provided by a spindle which threadedly engages the portion of the key in the non-radial recess, and the spindle is lockable against rotation by means of a lock nut on a threaded stem on the spindle which draws a collar on the spindle against a plate through which the stem passes, the plate being removably secured to the periphery of the outer machine part and closing off the non-radial recess. By removing the plate the cranked key can be withdrawn.

10 Claims, 3 Drawing Figures

APPARATUS FOR POSITIONING COAXIAL ARRANGED MACHINE PARTS

Figure 1:
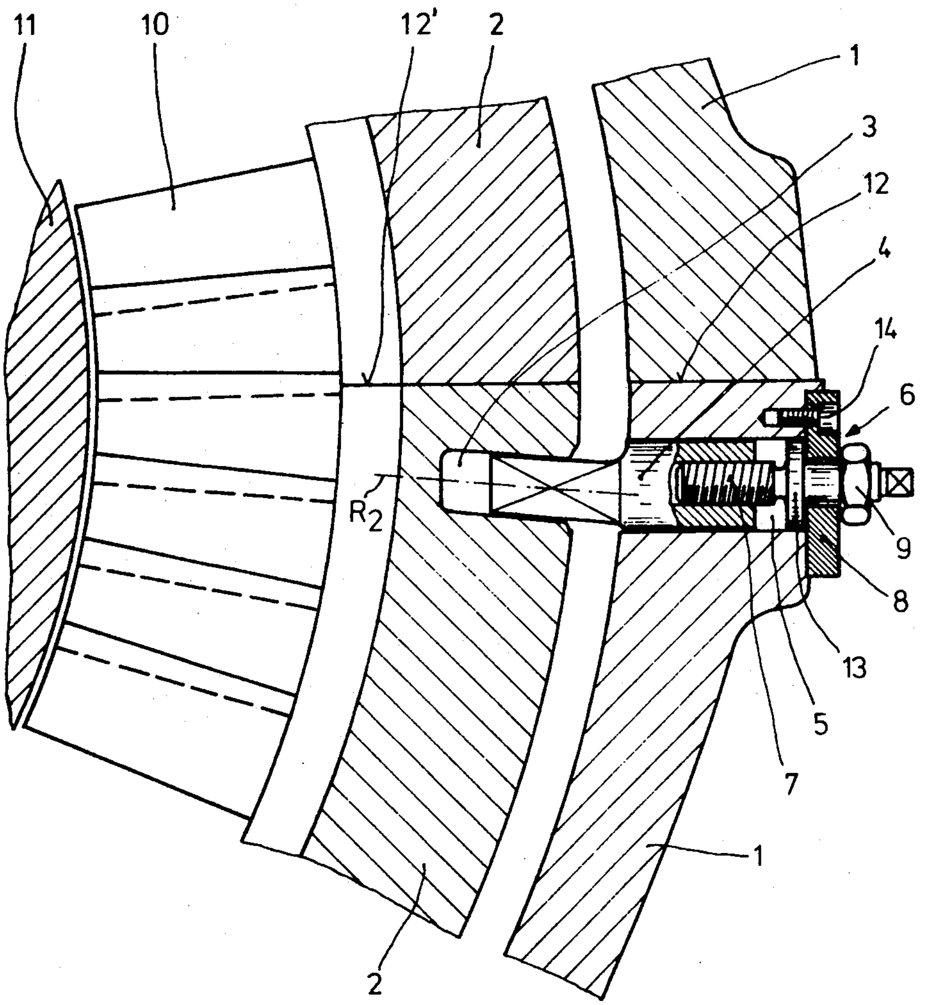

This invention relates to an improved apparatus to position two machine parts which are arranged, at least approximately, in a coaxial manner, for example a guide vane carrier and outer housing of a turbo-machine, whereby a second machine part that is arranged inside a first machine part is adjustable in a plane which is perpendicular to its longitudinal axis.

Positioning or centering devices of this type are primarily used for turbo-machine construction. One known design (book by J. Kruschik, "Die Gasturbine", second edition, published by Springer 1960, Vienna, page 266, figure 245 and page 267, third paragraph) discloses a heat-flexible suspension of the guide vane carrier within the turbine housing and its centering by means of radial bolts. Devices of this type require the simultaneous use of at least three radial pins and have the disadvantage that the two machine parts must be bored or reamed at the same time and that they can be positioned only with difficulties.

Other known devices, such as keys or radial pins with eccentric guides and eccentric intermediate bushings require a very high degree of precision for their manufacture, and their adjustment within a plane perpendicular to the machine axis requires a high degree of precision and expert knowledge.

The primary object of the invention is to provide an improved positioning arrangement of the above discussed general type which makes it feasible, especially in the case of fully enclosed machine parts, to make a stepless adjustment of the inaccessible, coaxially arranged inner part to any desired position in a simple manner and even during operations, for example the running of a turbo-machine.

The invention solves this problem in that manner that the under half portion, i.e. the portion below a horizontal axial plane of the inner machine part to be adjusted is provided at its outer perimeter and within one vertical plane with two radial recesses, extending symmetrically to the vertical axis, their centerlines forming an angle with the horizontal axis of the machine part to be adjusted, that the outer machine part is provided within the same vertical plane with the two non-radial recesses, and that both machine parts are connected with each other and can be positioned relative to each other by way of cranked or angular positioning keys which slide within the recesses, and wherein the center line of the key portion engaging the radial recess forms an angle with the center line of the key portion sliding within the non-radial recess.

The arrangement proposed by the invention accomplishes the desired objective at a lesser cost in comparison with the known methods; it has the additional advantage that it will not interfere with thermally induced radial movements of the various machine parts. This positioning apparatus is furthermore suitable for later intallation in previously completed plants if compatible with the general design.

It will be expedient if the recesses in the inner, adjustable machine part have a rectangular profile, and the recesses in the outer machine part a circular profile. The positioning keys, shaped in conformity with the profiles and orientations of the recesses, will then not be in need of a device to prevent their displacement.

It will further be advantageous to design the positioning keys in such manner that they can be inserted from the outside through the recesses in the outer machine part, and that they can be operated from the outside by handling means.

Figure 2:
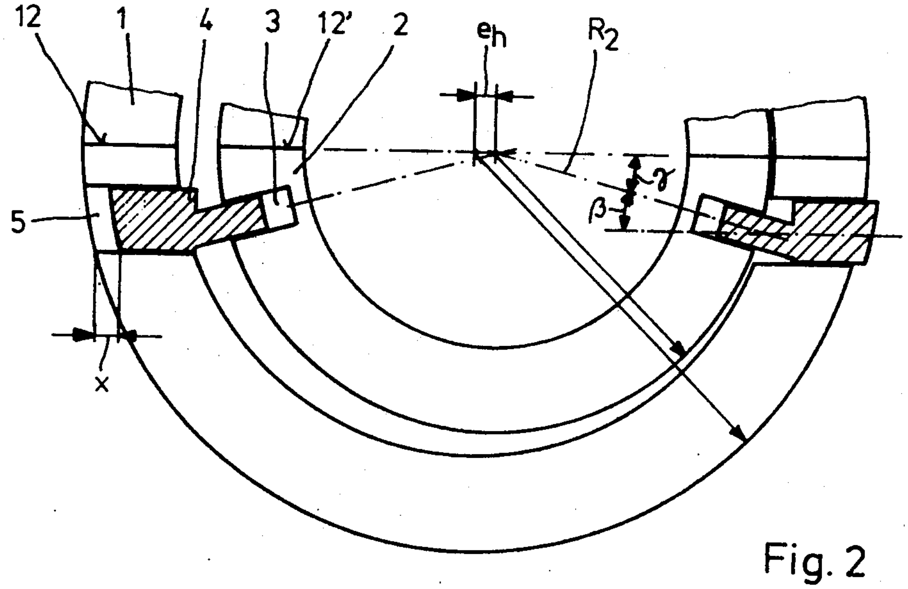
Figure 3:
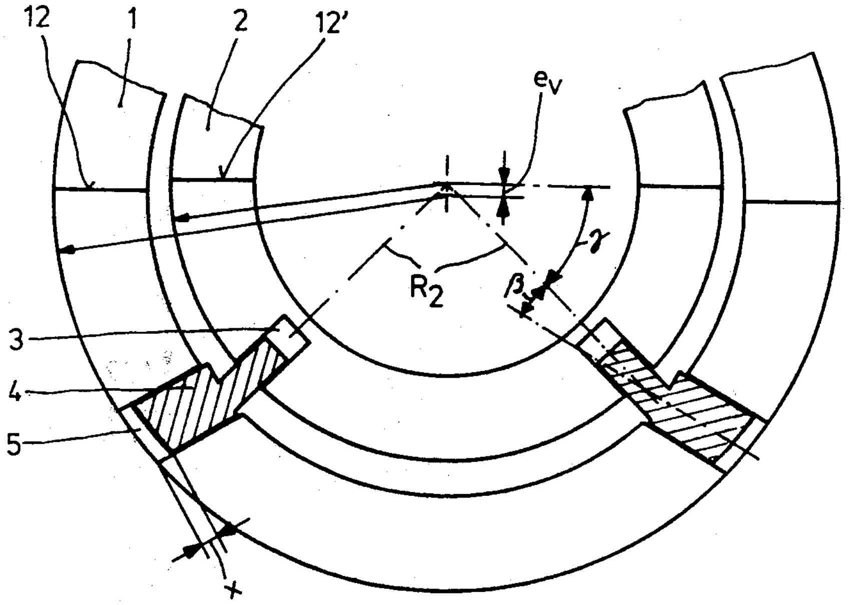

A preferred embodiment of the invention will now be described and is illustrated in the accompanying drawings wherein:

FIG. 1 shows a portion of a turbo-machine in cross section with the positioning apparatus according to the invention, FIG. 2 depicts a portion of the area shown by FIG. 1 in schematic form in order to explain its method of operation, and FIG. 3 illustrates a modification of the arrangement shown by FIG. 2.

FIG. 1 shows the outer machine part 1 in the form of a circular outer housing of a fluid flow machine which can be a compressor or a turbine. The inner adjustable machine part 2 is the guide vane carrier, shown in the form of a cylinder shell concentric with and spaced from the outer housing. Parts which are not essential for the invention, for example the radial sealing and guiding elements of the guide vane carrier at the housing, are omitted. The outer housing as well as the guide vane carrier consist of two semi-cylindrical parts, with a horizontal separation plane 12,12' between them.

The guide vanes are denoted by numeral 10, their blade tips to be positioned concentrically or, in the case of a multistage machine, coaxially to the rotor 11. The two positioning keys 4 proposed by the invention — only the key at the right is illustrated in this view — slide during the adjusting process within a recess 5 at the lower part of the housing and during the adjusting process as well as in the case of any thermal expansions within a radial recess 3 of the guide vane carrier, with the recesses 3 and 5 extending symmetrically to a — not illustrated — second vertical plane of the machine which includes the longitudinal axis.

Since the center lines $R_2$ of the recesses 3 extend in a radial direction from the axis of the vaned rotor 11 and will therefore intersect within the longitudinal axis of the guide vane carrier, their part will always maintain its center as positioned, even in the case of extreme thermal expansions.

In the example illustrated, the recess 3 has a square, and the recess 5 a circular profile. The positioning key 4, which is provided with correspondingly profile portions 4a and 4b is dimensioned thusly that its cranked square portion 4a will not project over the cylindrical part 4b facing the housing. It is therefore possible to introduce as well as remove the key from the outside of the housing, and the key can also be manufactured from one piece by a relatively simple processing.

The key 4 is operated from the outside of the housing by means of operating parts 6, consisting of the threaded spindle 7, the plate 8, the lock nut 9 and a — not illustrated — handling tool such as a wrench, or a handle, or the like. The threaded spindle 7, which is screwed into a threaded recess in the positioning key 4, is provided with a collar 13 and a not further identified outer threaded stem and a square projection, but the latter part can also be designed in the form of a hexagon, flattened on two sides or in the form of a pin with the traverse holes. The lock nut 9, screwed onto the outerthreaded stem, forms together with the collar 13 the axial support for the threaded spindle 7 in the bore of the plate 8 which closes off the recess 5. The lock nut 9 is tightened during an adjusting operation so that the collar 13 is pressed against the inner side of the plate 8, thereby sealing off completely the bore within the plate. A slight loosening of the lock nut 9 allows a longitudinal movement of the positioning key 4 in its housing-side guide part by rotation of the threaded spindle 7. This causes at the same time a relative movement between the square portion 4*a* of the positioning key and the corresponding recess 3 in the guide vane carrier, resulting in a shift of the center of the guide vane carrier within the plane vertically to the machine axis.

It is possible by the unscrewing of the plate-fastening screw 14 to withdraw the positioning key 4 together with the operating parts 6 from the system in the form of an assembled unit, whereby the positioning key 4 will always maintain its originally set optimum position, a feature which is particularly advantageous if the system is repeatedly assembled and disassembled.

FIG. 2 shows how the arrangement of the invention operates in practice. This very simplified schematic view depicts the inner machine part 2 in one extreme position. As in FIG. 1, the recess 5 of the machine part 1 is arranged in such manner that its center line is parallel to the horizontal separation surface 12 (or vertical to the vertical axis), an arrangement which facilitates manufacturing in the case of a cylindrical bore.

The center line of the cranked portion of the positioning key 4 extends in a radial direction and forms the angle $\beta$ with the center line of that portion of the positioning key 4 which is guided within the machine part 1, and forms the angle $\gamma$ with the horizontal line; these two angles are hence identical in size and any shifting of the part 2 resulting from the adjustment of the positioning key 4 is determined by the following rule:

In the case of a purely horizontal adjustment by an amount $x$, the part 2 will shift by $e_h = x \cdot \cos(\gamma - \beta)$; if the two angles are identical, then $e_h = x$, and the two symmetrically arranged positioning keys will be shifted by the same amount and in the same direction (in FIG. 2 from left to right).

If a purely vertical shift of part 2 is desired (not illustrated), there applies the formula $e_v = x \cdot tg\,\beta = x \cdot tg\,\gamma$; both keys 4 are adjusted by the same amount of $x$ but in opposite direction; both keys will slide in the recesses 5 of part 1 either inwardly or outwardly for the purpose of either raising or lowering the part 2.

Obviously it is possible to combine the two shifting motions described above, and the part 2 can thus be adjusted in all directions about the center.

In FIG. 2 the manner of operation of the invention is demonstrated on the basis of one specific case; the arrangement shown by FIG. 3, where a greater angle $\gamma$ is selected and used to arrive at the general principle.

First, there will be discussed a purely vertical shift of the part 2 by the amount $e_v$. For the purpose of proper comparison, the same value was selected from the angle $\beta$ as in the case of FIG. 2. There applies the following general formula:

$$e_v = x\,[\cos(\gamma - \beta) \cdot tg\,\gamma - \sin(\gamma - \beta)]$$

For a purely horizontal shift (not illustrated) the formula reads:

$$e_h = x\left[\cos(\gamma - \beta) - \frac{\sin(\gamma - \beta)}{tg\gamma}\right]$$

A combination of the above two discussed shifts is also obviously possible.

The order of magnitude of the shift $e$ is, in fact, a function of the key adjustment $x$ as well as of the two angles $\gamma$ and $\beta$.

The selection of the angles $\beta$ and $\gamma$, and in particular the selection of $\gamma$, is primarily related to the following three parameters:

The position of the machine part 2 is clearly defined by the intersection of the radial center lines of the two positioning keys 4. Any additional guidance, for example in the form of a known spike support along the vertical axis, would only overdefine the center position and complicate unnecessarily the precise adjustment; it is therefore not needed if the angle $\gamma$ is made sufficiently large.

If the inner cylindrical machine part 2 is divided by a horizontal separation plane 12', the lower portion should be subjected a minimal deformation only when the upper portion is removed. Such deformation could occur in the loosening or tightening sense at the arch due to the bearing forces which are operative at the recess 3 and are determined by the angle $\gamma$.

The angle $\gamma$ between the radial line $R_2$ and the separating plane should be smaller than the angle of friction $\rho = \text{arc}\,tg\,\mu$, where $\mu$ represents the coefficient of friction between the materials of the positioning key 4 and of the machine part 2.

A utilization of the angle $\beta$ for the prevention of any rotary displacement is meaningful only if the angle $\beta$ is sufficiently large and the sliding clearances between the positioning key 4 and the recesses 3 and 5 are small. In such a case it would be possible to make the recess 3 within the machine part 2 cylindrical, which would result in lower costs of manufacture.

Finally, there is to be mentioned the simplicity of handling the positioning apparatus. Upon assembly and disassembly of the machine part 2 and of the positioning keys 4, the keys 4 are inserted into the recess 3 during a lowering of the part 2, or respectively removed from the recess 3 during a raising of part 2.

The invention is obviously not limited to the species illustrated by the drawings. For example, the length of adjustment travel can be increased by means of inserts in the recess 3 instead of the above-described increase in the angle $\gamma$, an arrangement which can be used with advantage for coarse settings.

The angle $\gamma$ can also assume negative values, thus reversing the direction of adjustment. In this case the ratio $x/e$ will increase with a decrease of the angle $\beta$.

Not only the illustrated two-piece machine parts but also closed parts such as pot-shaped housings of turbomachines can be centered by the positioning apparatus proposed by the invention.

I claim:

1. In an arrangement for positioning an inner circular machine part within an outer circular machine part, and wherein the inner circular part is desired to be adjustable within a first plane perpendicular to the longitudinal axis of the machine, the improvement wherein the outer periphery of said inner machine part is provided with radially extending recesses spaced around the periphery thereof, said recesses being located within the first vertical plane and extending symmetrically to a second vertical plane including the longitudinal axis of the machine, and the center lines of said radial recesses forming an angle $\gamma$ with the horizontal axis of the inner machine part, said outer machine part being provided with circumferentially spaced non-radial recesses within the first vertical plane and located in alignment with said radial recesses, and angular positioning keys interconnecting each said radial recess with a non-radial recess, respectively, said keys being slidable in said recesses and the center line of the portion of each key engaging said radial recess forming an angle $\beta$ with the center line of the portion of each key slidable within said non-radial recess whereby adjustment of said keys effects movement of one of said machine parts in said first vertical plane.

2. In an arrangement for positioning an inner circular machine part within an outer circular machine part, and wherein the inner circular part is desired to be adjustable within a first plane perpendicular to the longitudinal axis of the machine, the improvement wherein the outer periphery of said inner machine part is provided with radially extending recesses spaced around the periphery thereof, said recesses being located within the first vertical plane and extending symmetrically to a second vertical plane including the longitudinal axis of the machine, and the center lines of said radial recesses forming an angle $\gamma$ with the horizontal axis of the inner machine part, said outer machine part being provided with circumferentially spaced non-radial recesses within the first vertical plane and located in alignment with said radial recesses, said angular positioning keys interconnecting each said radial recess with a non-radial recess, respectively, said keys being slidable in said recesses and the center line of the portion of each key engaging said radial recess forming an angle $\beta$ with the center line of the portion of each key slidable within said non-radial recess, wherein the angle $\gamma$ is smaller than the angle of friction $\rho = \text{arc } tg\ \mu$ wherein $\mu$ represents the coefficient of friction between the materials of the positioning key and the inner machine part.

3. In an arrangement for positioning an inner circular machine part within an outer circular machine part, and wherein the inner circular part is desired to be adjustable within a first plane perpendicular to the longitudinal axis of the machine, the improvement wherein the outer periphery of said inner machine part is provided with radially extending recesses being located within the first vertical plane and extending symmetrically to a second vertical plane including the longitudinal axis of the machine, and the center lines of said radial recesses forming an angle $\gamma$ with the horizontal axis of the inner machine part, said outer machine part being provided with circumferentially spaced non-radial recesses within the first vertical plane and located in alignment with said radial recesses, and angular positioning keys interconnecting each said radial recess with a non-radial recess, respectively, said keys being slidable in said recesses and the center line of the portion of each key engaging said radial recess forming an angle $\beta$ with the center line of the portion of each key slidable within said non-radial recess, wherein the radial recesses in the inner machine part to be adjusted have a rectangular profile.

4. A positioning arrangement for two machine parts one within the other as defined in claim 1 wherein the non-radial recesses in the outer machine part have a circular profile.

5. A positioning arrangement for two machine parts one within the other as defined in claim 1 wherein the outer machine part consists of two halves which meet in a horizontal divider plane and wherein the center lines of the non-radial recesses in said outer machine part extend parallel to said divider plane.

6. In an arrangement for positioning an inner circular machine part within an outer circular machine part, and wherein the inner circular part is desired to be adjustable within a first plane perpendicular to the longitudinal axis of the machine, the improvement wherein the outer periphery of said inner machine part is provided with radially extending recesses spaced around the periphery thereof, said recesses being located within the first vertical plane and extending symmetrically to a second vertical plane including the longitudinal axis of the machine, and the center lines of said radial recesses forming an angle $\gamma$ with the horizontal axis of the inner machine part, said outer machine part being provided with circumferentially spaced non-radial recesses within the first vertical plane and located in alignment with said radial recesses, and angular positioning keys interconnecting each said radial recess with a non-radial recess, respectively, said keys being slidable in said recesses and the center line of the portion of each key engaging said radial recess forming an angle $\beta$ with the center line of the portion of each key slidable within said non-radial recess, wherein the non-radial recesses in said outer machine part with the keys inserted therein are closed off in a pressure-proof manner by means of a plate which is releasably secured to the outer surface of said outer machine part.

7. A positioning arrangement for two machine parts one within the other as defined in claim 1 wherein said non-radial recesses extend through said outer machine part and wherein the part of each said angular positioning key which is slidable within said non-radial recess includes an internally threaded portion threadably engageable with a rotationally mounted spindle portion which provides for a longitudinal adjustment of said internally threaded portion as said spindle portion is rotated.

8. A positioning arrangement for two machine parts one within the other as defined in claim 7 wherein said spindle portion includes a collar and a threaded stem portion which extends through an opening in a plate member removably secured to the outer surface of said outer machine part, said lock nut being tightenable against said plate thereby to draw said collar against the side of said plate and secure the key against movement.

9. A positioning arrangement for two machine parts one within the other as defined in claim 1 wherein said angles $\gamma$ and $\beta$ are equal.

10. In an arrangement for positioning an inner circular machine part within an outer circular machine part, and wherein the inner circular part is desired to be adjustable within a first plane perpendicular to the longitudinal axis of the machine, the improvement wherein the outer periphery of said inner machine part is provided with radially extending recesses spaced around the periphery thereof, said recesses being located within the first vertical plane and extending symmetrically to a second vertical plane including the longitudinal axis of the machine, and the center lines of said radial recesses forming an angle $\gamma$ with the horizontal axis of the inner machine part, said outer machine part being provided with circumferentially spaced non-radial recesses within the first vertical plane and located in alignment with said radial recesses, and angular positioning keys interconnecting each said radial recess with a non-radial recess, respectively, said keys being slidable in said recesses and the center line of the portion of each key engaging said radial recess forming an angle $\beta$ with the center line of the portion of each key slidable within said non-radial recess, wherein angle $\gamma$ is greater than angle $\beta$.

* * * * *